Figure 3:
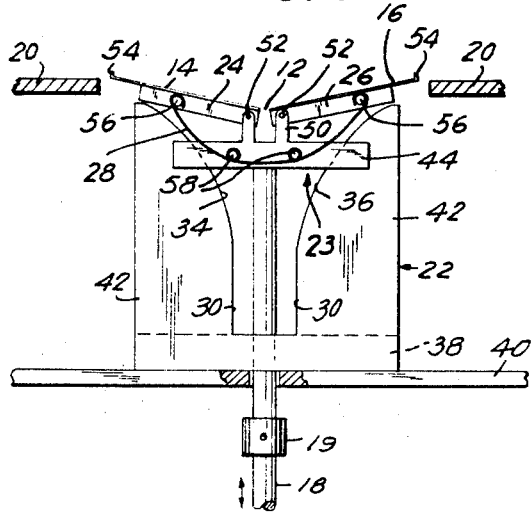

Sept. 20, 1966     A. SKROBISCH     3,273,270
SEGMENTED EXHIBITOR
Filed Sept. 23, 1965     4 Sheets-Sheet 1
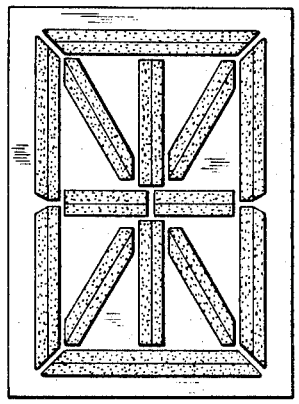
FIG. 1
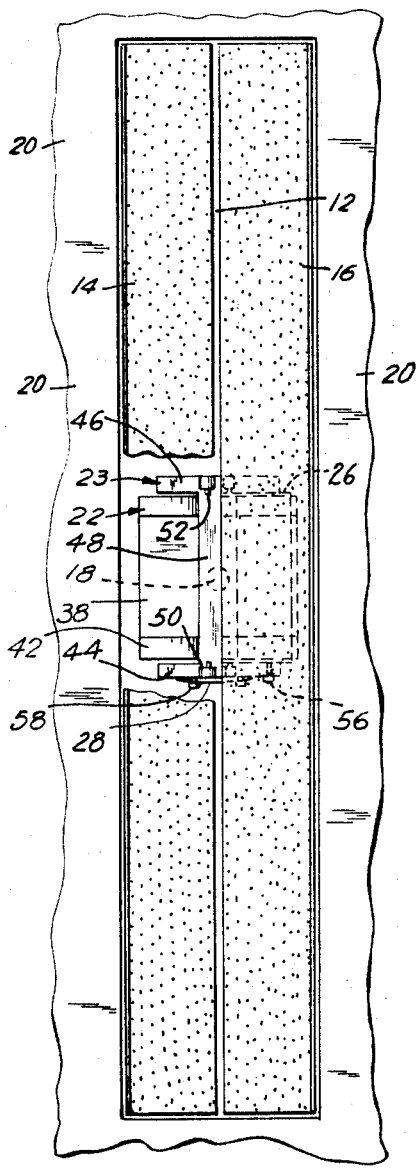
FIG. 2
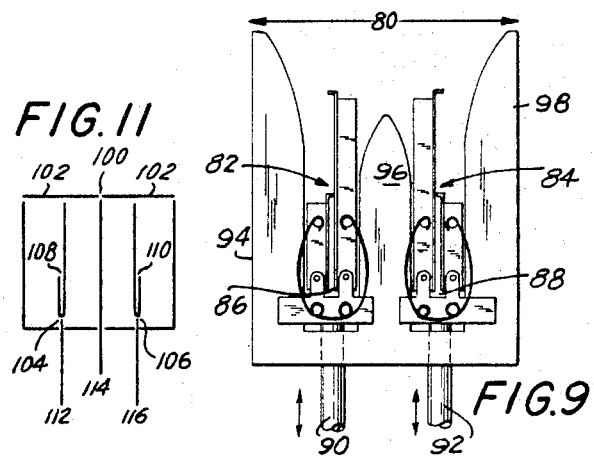
FIG. 9
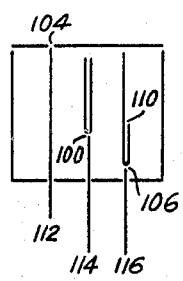
FIG. 11
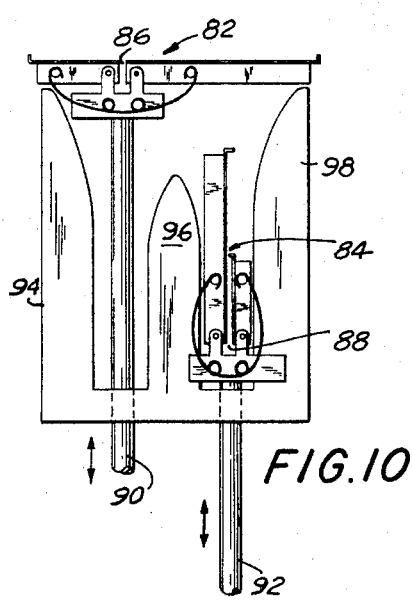
FIG. 12
FIG. 10
INVENTOR.
ALFRED SKROBISCH
BY *James and Franklin*
ATTORNEYS Sept. 20, 1966     A. SKROBISCH     3,273,270
SEGMENTED EXHIBITOR
Filed Sept. 23, 1965     4 Sheets-Sheet 2

INVENTOR.
ALFRED SKROBISCH
BY
*James and Franklin*
ATTORNEYS

Sept. 20, 1966 A. SKROBISCH 3,273,270
SEGMENTED EXHIBITOR
Filed Sept. 23, 1965 4 Sheets-Sheet 3

INVENTOR.
ALFRED SKROBISCH
BY James and Franklin
ATTORNEYS

Sept. 20, 1966  A. SKROBISCH  3,273,270
SEGMENTED EXHIBITOR
Filed Sept. 23, 1965  4 Sheets-Sheet 4
FIG. 17
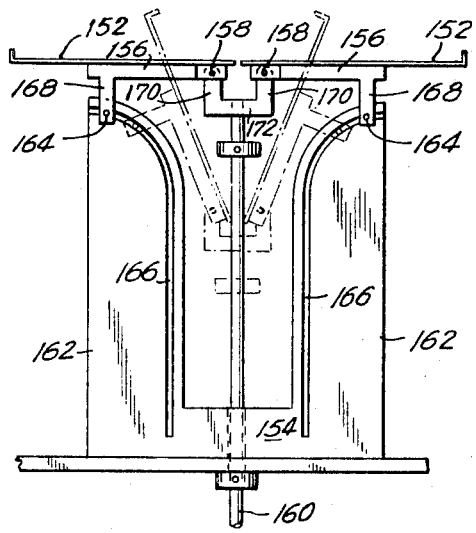
FIG. 18
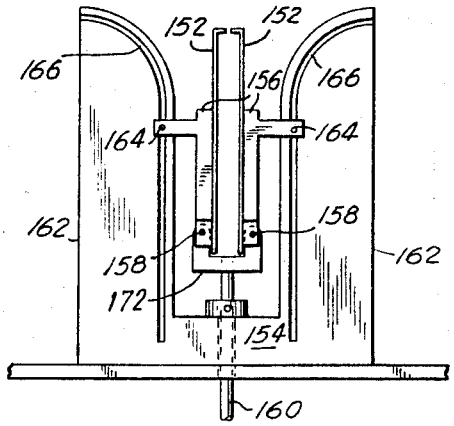
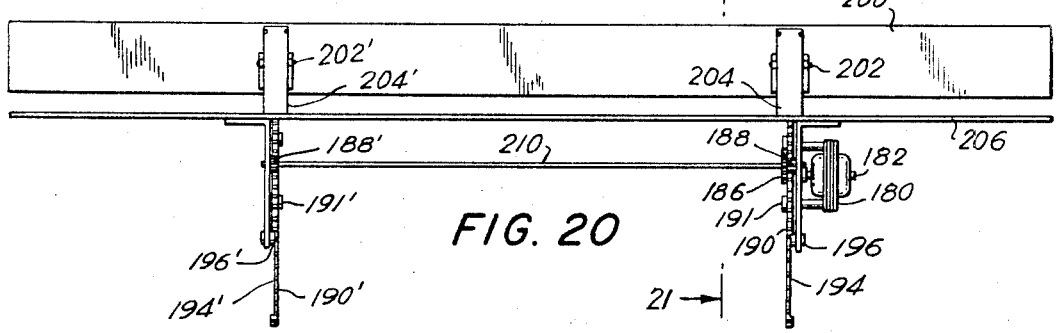
FIG. 20
FIG. 19
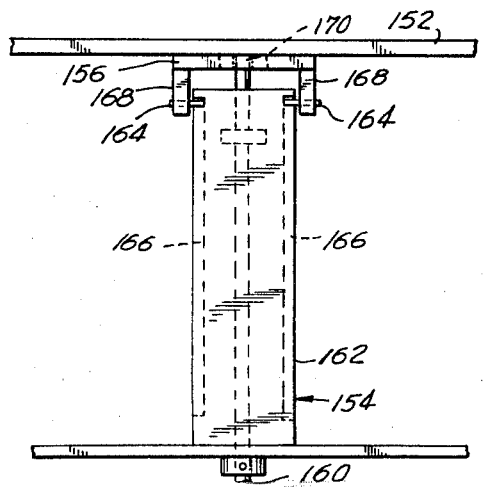
FIG. 21
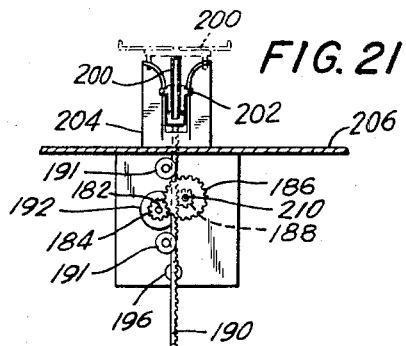
INVENTOR.
ALFRED SKROBISCH
BY James and Franklin
ATTORNEYS United States Patent Office  3,273,270
Patented Sept. 20, 1966

3,273,270
SEGMENTED EXHIBITOR
Alfred Skrobisch, Huntington Station, N.Y., assignor to Allard Instrument Corp., Westbury, N.Y., a corporation of New York
Filed Sept. 23, 1965, Ser. No. 493,613
21 Claims. (Cl. 40—52)

This application is a continuation-in-part of my application Serial No. 312,685, filed September 30, 1963, and now forfeited.

The invention relates to exhibitors, and more particularly to segmented exhibitors or readouts.

Segmented exhibitors or readouts are already known. It is my belief that a reflective readout is better than one using illuminated (lamp) segments. The latter are not good in daylight. In the aggregate they use enormous amounts of power for continuous illumination. There is greater maintenance cost. On the other hand, a reflective readout is visible in daylight and does not require any power except at the instant of change from one character to another. At night the board with its array of characters may be illuminated, or a reflective paint may be employed on the segments. In one desirable form a fluorescent paint may be used which is luminous when exposed to ultraviolet light. This produces a high intensity display in daylight, and at night an inconspicuous or invisible ultraviolet illumination may be cast on the board, causing the characters to glow brightly.

The reflective readouts require segments which can be moved out of the way when not in use. In a small size, the segments may be moved aside or rolled over, but in a large character using wide segments for clear and distinct visibility, for example for large signs on a thruway, such sideward movement of segments is not desirable.

The general object of the present invention is to overcome the foregoing difficulty, and to provide a reflective readout or exhibitor suitable for large signs using characters of say eight, twelve or eighteen inches high. A further object is to employ a segment which may be operated by means of a simple linear actuator moving in a direction perpendicular to the display board, so that each actuator is readily located directly behind its segment. For alpha numeric display a considerable number of segments, say fourteen segments, may be required for each character, but there is no difficulty in nesting the necessary actuators in such close relation when each actuator is dimensionally limited to the region directly behind its segment.

In accordance with a main feature and object of the present invention, each segment is divided into a plurality of vanes pivoted at adjoining edges, so that the vanes may fold in face-to-face relation, and the actuator is operatively connected to the pivoted edges so that retraction of the vanes at the pivoted edges folds them in face-to-face relation for effective concealment when not in use.

For some purposes it may be desired to color the readout differently for different displays. For example, a traffic sign may use green for "All Clear" and amber or red for "Slow." A further object of the present invention is to provide a segmented exhibitor, as previously described, in which each segment space may be occupied by any one of a plurality of differently colored segments, each of the differently colored segments having its own actuator.

Figure 4:
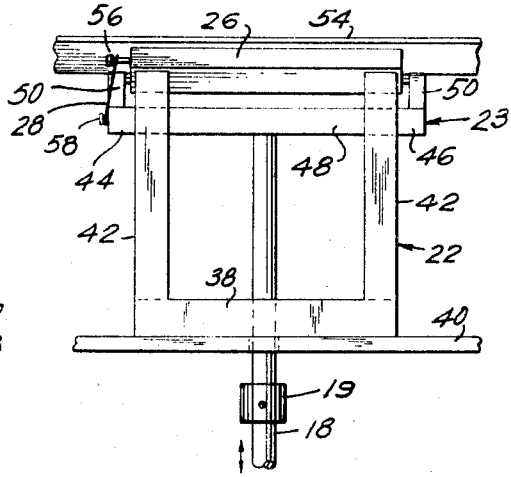
Figure 5:
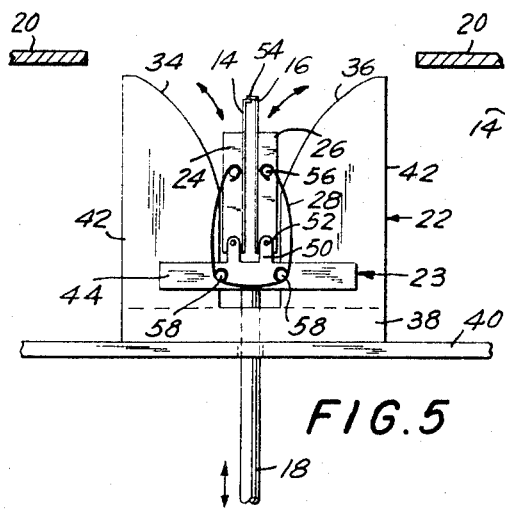
Figure 6:
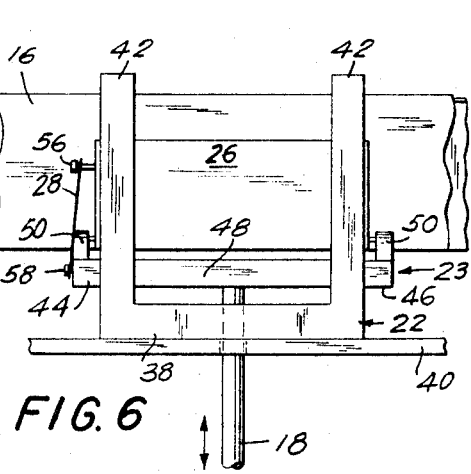
Figure 8:
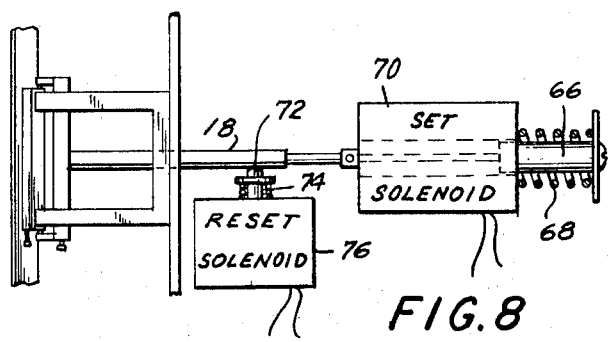
Figure 7:
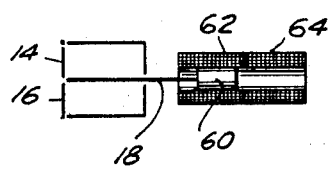
Figure 13:
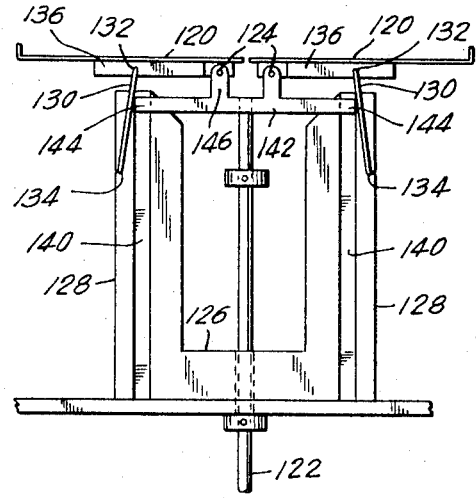
Figure 14:
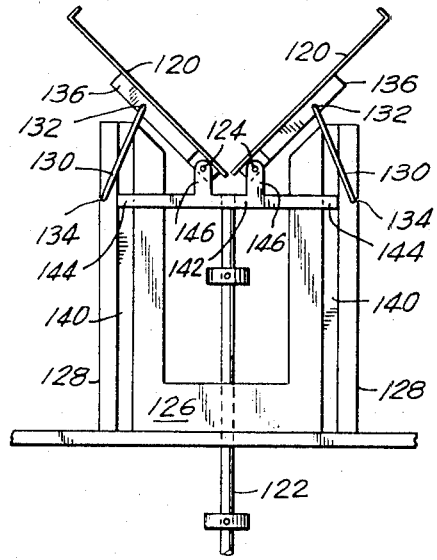
Figure 15:
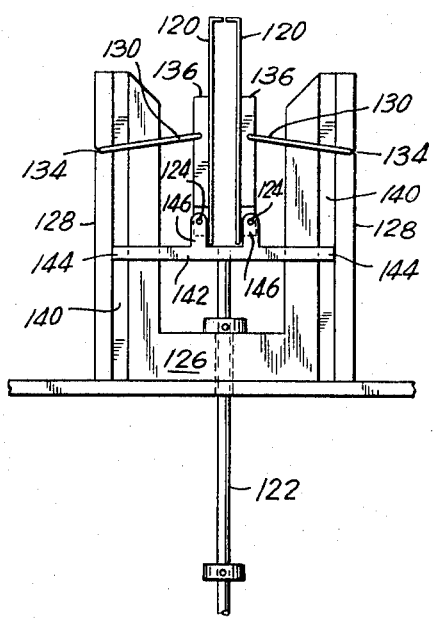
Figure 16:
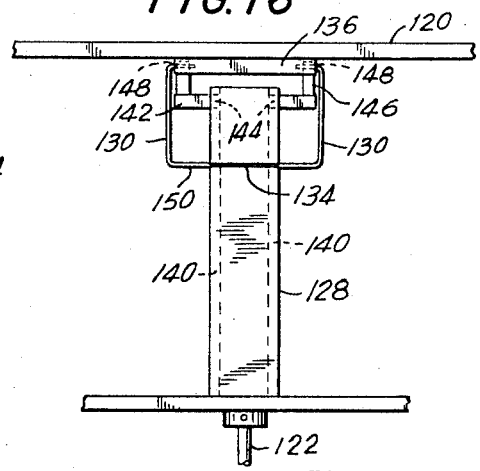

To accomplish the foregoing general objects, and other more specific objects which will hereinafter appear, my invention resides in the segmented exhibitor elements and their relation one to another, as are hereinafter more particularly described in the following specification. The specification is accompanied by drawings in which:

FIG. 1 shows one array of segments which may be used for alpha numeric characters;
FIG. 2 shows one of the segments drawn to larger scale;
FIG. 3 is an end view of the segment shown in FIG. 2, and shows the relation of parts as retraction of the segment begins;
FIG. 4 is a side view of the parts shown in FIG. 3;
FIG. 5 is a view similar to FIG. 3, but showing the segment nearly fully retracted;
FIG. 6 is a side view of the parts shown in FIG. 5;
FIG. 7 is a small schematic view showing a simple solenoid actuator;
FIG. 8 shows an actuator of the solenoid type provided with an auxiliary latching solenoid;
FIG. 9 is an end view like FIG. 5, but showing two differently colored segments in a single space, with both segments retracted;
FIG. 10 is a similar view, but with one color exposed;
FIG. 11 is a schematic representation showing how three different colors may be employed;
FIG. 12 is a view similar to FIG. 11, but with a different one of the three colors exposed;
FIG. 13 shows a modification in which the folding of the vanes is positively controlled by pivoted linkage;
FIG. 14 is a similar view showing partial folding of the vanes;
FIG. 15 is a similar view showing the vanes folded;
FIG. 16 is a side elevation looking toward the right of FIG. 13;
FIG. 17 shows still another form of the invention in which the riders are guided by curved guide tracks;
FIG. 18 is a similar view with the vanes folded;
FIG. 19 is a side elevation looking toward the right side of FIG. 17;
FIG. 20 illustrates the use of a rotary actuator with a gear rack, and also shows the use of dual spaced actuator rods; and
FIG. 21 is a view looking in the direction of the arrows 21—21 of FIG. 20.

A sign or display board may have one or several lines of characters, all changeable in response to externally supplied signals. For this purpose each character is made up of segments, different combinations of which are employed to make up a desired alpha numeric character. FIG. 1 shows one array of segments which may be used at each character, the particular array there shown making use of fourteen segments. Other arrays have been devised and could be employed, and the present improvement concerns the structure and actuation of the individual segments, rather than the particular array preferred for the complete character.

Referring now to FIGS. 2–6 of the drawing, each segment is longitudinally divided at 12 to form two vanes 14 and 16 which are pivoted at their adjoining edges to fold in face-to-face relation, as shown by the change from FIG. 3 to FIG. 5. There is a linear actuator behind each segment, including an actuator rod 18 which is disposed substantially perpendicular to the display area 20. In practice the rod 18 is usually horizontal, the board 20 being vertical. The rod 18 is operatively connected to the pivoted edges, and when the rod is retracted the vanes fold together to conceal their faces, as shown in FIG. 5; whereas when the rod is advanced, the vanes are opened to expose their faces, as shown in FIGS. 2 and 3.

In FIGS. 3 and 4 the vanes have nearly but not quite fully opened. It will be understood that the outer faces are preferably coated with a high intensity paint, indicated by stippling in FIG. 2; whereas the backs of the vanes and the other parts of the mechanism shown in FIGS. 3–6 are preferably finished in a dull black so that there will be no reflection at a segment space or window behind which a segment has been retracted.

Considering the arrangement in greater detail, there is a fixed guide block 22, and a crosshead 23 which is secured to the actuator rod 18, and which is guided in the block 22. There are riders 24 and 26 carrying the vanes 14 and 16 respectively. A light spring wire 28 is so connected to the riders 24 and 26 as to tend to spread the vanes 14 and 16 to exposed position. The guide block 22 has smooth, curved, rearwardly convergent guide surfaces 34 and 36 for the riders 24 and 26, the riders sliding on the surfaces 34 and 36 which help guide them into the desired folded position as the rod 18 and crosshead 23 are retracted, as shown in FIG. 5. In the retracted position the riders are preferably held between parallel surfaces 30 (FIG. 3) which counteract any tendency of the spring 28 to spread the riders. In FIG. 5 the riders have been nearly but not fully retracted. With this arrangement, the segment is stable in either its forward exposed position, or in its retracted concealed position.

The block 22 may be molded as a single body of plastics material, this including a base portion 38 which is fixedly mounted on a suitable frame plate 40, and four forwardly projecting arms 42 which provide the guide surfaces 30, 34, and 36 previously referred to.

The crosshead 23 is somewhat "I" shaped. The ends 44 and 46 are disposed outside the guides 42, and the connecting bar 48 extends between the guides 42. The end pieces 44 and 46 have upstanding bearings 50 for pivot pins 52 which pivot the riders 24 and 26 to the crosshead. In FIG. 2 the left rider is omitted, along with the mid-portion of vane 14. It will be understood that the ends 44 and 46, the connecting bar 48, and the bearings 50 of the crosshead all may be integrally molded.

The vanes 14 and 16 are preferably made of a thin lightweight sheet metal, typically aluminum. The outer longitudinal edges preferably are bent to provide exceedingly narrow flanges 54. The flange 54 has the advantage of somewhat stiffening the thin material used for the vane. It has an additional important advantage of concealing the high intensity painted surface when the vane has been retracted. This will be evident from inspection of FIG. 5, in which the flanges 54 conceal the faces of the vanes. It will be understood that the backs of the vanes and flanges, as well as the surfaces of the riders, crosshead, and block, are all given a dull black finish which avoids reflection.

In the form here illustrated the spring 28 is coiled at its ends about pins 56 projecting from the riders. At intermediate points the spring wire is preferably coiled about pins 58 projecting from the elevator 23. This construction holds the spring in position, and the tendency of the spring wire to return to straight condition ensures opening of the vanes when moved forward, as shown by the change from FIG. 5 to FIG. 3 of the drawings.

FIGS. 3 and 5 do not show the end position, the segment being slightly retracted in FIG. 3 and nearly but not quite fully retracted in FIG. 5. The bottom 38 of block 22 provides a limiting stop for retraction of the operating rod 18, this acting when the crosshead bottoms against the base of the block. In advanced position the rod may be stopped by a collar or cross pin on the rod, as shown at 19 in FIG. 3.

The actuator may take any of a number of forms. In FIG. 7, I schematically show an exceedingly simple actuator in which a solenoid core 60 is moved to the left when solenoid coil 62 is energized, and is moved to the right when solenoid coil 64 is energized. The rod 18 is connected directly to core 60. Thus, the segment 14, 16 is displayed when coil 62 is energized, and is concealed when coil 64 is energized. It will be understood that the device need be energized only momentarily to cause a change from one position to the other, it then remaining in set position. The rod 18 is shown horizontal in FIG. 7, that being its usual position.

Although the simple solenoid arrangement of FIG. 7 will remain in either position, it is not positively locked in position, and another arrangement is shown in FIG. 8 in which solenoid core 66 is urged to the right by a compression spring 68. It may be pulled to the left by energization of a main solenoid 70, thus causing the actuator rod 18 to expose the segment. The rod 18 then is latched in forward position by a latch 72 which is resiliently urged into locking position by a spring 74. When it is desired to reset or conceal the segment, a reset solenoid 76 is energized, thereby momentarily retracting the latch 72 and so permitting spring 68 to retract core 66. Here again only momentary energization is needed to change the position of the segment.

As so far described, each segment space or window may be filled with a single segment, but if desired a plurality of differently colored segments may be provided, so that a desired character may be displayed in a desired color. Referring to FIGS. 9 and 10, the segment space at 80 may be occupied by either segment 82 or segment 84. The longitudinal dividing line 86 of segment 82 is offset from the center toward the left, as viewed in FIG. 10; and the longitudinal dividing line 88 of the segment 84 is offset from the center toward the right. Each segment has its own actuator rod and actuator. Thus, if rod 90 is advanced, as shown by the change from FIG. 9 to FIG. 10, the segment 82 is exposed. In FIG. 9, both segments are retracted. By advancing actuator rod 92 the segment 84 would be exposed. Thus a desired character may be displayed in one color or the other, it being understood that separate wiring is employed for the two different sets of actuators. In practice, the fourteen individual wires for the fourteen segments may be the same for either color, in which case two separate common return lines are emloyed, one for one color, and the other for the other color.

It will be noted that the guide block has three guide arms 94, 96 and 98 at each end, instead of two as shown in FIG. 5; and that the riders and vanes are unsymmetrical rather than symmetrical.

It is believed that for most purposes a single color (typically white vanes on a dark back board) will suffice. For special purposes two colors, say green and red, or green and amber, may be employed. However, if more than two colors are wanted they may be provided, and this is illustrated in FIGS. 11 and 12 which show how that may be done.

For this purpose the longitudinal dividing line 100 of segment 102 may be central, while the dividing lines 104 and 106 of the other two vanes 108 and 110 are offset in opposite directions. When all of the segments are retracted and folded, they are disposed side-by-side behind a single segment space. Each segment has its own actuator rod, indicated at 112, 114, and 116, so that any character may be displayed in any desired one of the three different colors, In a typical case, the colors may be red, amber and green.

As so far described the guide block is curved and the vanes have springs, but the vanes may be folded together without using curved guides and may be spread without using springs. Such an arrangement is illustrated in FIGS. 13–16, referring to which the vanes 120 are moved by an actuator rod 122 which is pivotally connected at 124 to the inner edges of the vanes. As before, there is a stationary guide block 126 fixedly secured behind the segment, and having spaced supports 128. There are means, in this case pivoted wire links 130, which connect the vanes at points 132 which are spaced outward from the inner edges of the vanes, to the supports 128 at points 134. As will be seen by comparison of FIGS. 13, 14 and 15, retraction of the vanes by the actuator rod 122 into the block 126 folds the vanes in face to face relation between the supports 128, thereby concealing the faces of the vanes, and conversely, as shown by the reverse progression from FIG. 15 to FIG. 14 to FIG. 13, advance of the vanes 120 out of the block 126 opens the vanes in edge-to-edge spread relation in order to expose their faces as shown in FIG. 13.

The segments are made of a thin lightweight material such as thin sheet aluminum, and as before they are preferably carried by riders 136 which may be made of a moldable plastics material. It then is the riders 136 which receive the pivotal connections 124 and 132. Both the riders and the vanes are folded into face to face or parallel relation between the supports 128, as shown in FIG. 15.

In accordance with a further refinement of the structure the spaced supports 128 of the block 126 have straight guide tracks 140, which in this case are grooves, and the upper end of actuator rod 122 is secured to a crosshead 142 the ends of which straddle the posts or arms 128, and additionally have inward projections at 144 which are received in the grooves 140 and which guide the crosshead 142 as it is moved by the actuator rod 122. The crosshead 142 has four ears 146 which carry the pivots 124. The guide block 126 and the crosshead 142 may be molded out of nylon or Teflon or other plastics material which has self-lubricating properties.

In the particular structure here illustrated two links 130 are formed of a single piece of bent wire, the ends of which are bent inward as shown at 148 in FIG. 16. The cross connection 150 acts as the pivot at 134, and may be pressed into an undercut bearing; that is, the bearing receiving the same has a narrow slit through which the wire may be forced.

Still another form of the invention in which the vanes are positively opened without springs may be described with reference to FIGS. 17, 18, and 19 of the drawings. Here again there are vanes 152 with a fixed guide block 154 carrying the same. The vanes preferably are carried on riders 156, and these are pivotally connected at their adjacent inner edges as shown at 158, to an actuator rod 160. The outer edges of the riders are connected to the spaced supports 162 of block 154 by means of pins 164 which slide in guide tracks or grooves 166, the upper portions of which grooves are curved outward as shown in FIGS. 17 and 18.

It will be evident from comparison of FIGS. 17 and 18, including also the intermediate position shown in broken lines in FIG. 17, that retraction of the actuator rod 160 retracts and folds the vanes 152 and riders 156 in face-to-face relation between the spaced supports 162, thereby concealing the faces of the vanes. Conversely, advance of the rod 160 opens the vanes and riders to an edge-to-edge spread relation in order to expose the faces of the vanes 152.

Here again the vanes 152 may be made of a very thin light-weight material such as thin sheet aluminum, and the riders 156 may be molded out of a suitable plastics material, including the ears 168 which may be molded integrally with the riders. The pivots 158 may be carried by projections 170 on a small piece 172 secured to the end of the actuator rod 160. In this case there are only two projections 170, one for each rider, and each projection is received in a slot in the rider. There could be four projections straddling the riders, as in FIGS. 13–16.

In FIGS. 7 and 8 the actuator is a solenoid, but for a long stroke, as is needed when working with segments of large size, it is advantageous to use a miniature reversible motor of the rotary type, and such an arrangement is illustrated in FIGS. 20 and 21. Motor 180 has a shaft 182 carrying a small pinion 184 meshing with a large gear 186, which in turn carries a small pinion 188. The actuator rod 190 is a slender gear rack the teeth of which mesh with pinion 188. It is guided by two rollers 191, spaced on either side of the opposed pinion 188.

The reduction gearing 184, 186 preferably includes a slip clutch, and in the present case this is disposed at 192 (FIG. 21), between the motor shaft and the pinion 184.

The travel of the actuator rod may be positively limited in any desired fashion, and in the present case part of the thickness of the rack 190 is cut away as shown at 194 (FIG. 20), and a fixed stop 196 is located in the recess or cut away portion of the rack. The stroke then is limited to the length of the recess 194 in the rack.

The vanes and support block mechanism of FIGS. 20 and 21 need not be described in detail, and may correspond to what is shown in FIG. 3, or FIG. 13, or FIG. 17. In the illustrated case they correspond to FIG. 17, the vanes 200 and riders 202 being carried in a guide block 204 located behind the vanes and fixedly mounted on a frame plate 206.

FIGS. 20 and 21 illustrate a further advantage of using a rotary motor to actuate the vanes. This arises with vanes of exceptional length, making it desirable to support the same on spaced riders with spaced actuator rods. For example, the character may be say four feet high, and the vanes may have a length of say two feet. In such case I use riders 202′ (FIG. 20) in a fixed guide block 204′ having an actuator rod 190′. These may be spaced from the correspondingly numbered parts 202, 204 and 190 by a distance of say one foot. A single drive motor 180 is employed, terminating in a pinion 188 as previously described, but this pinion is carried on a long shaft 210 which carries another like pinion 188′ at its remote end, meshing with a gear rack actuator rod 190′. This too may be recessed for part of its length as shown at 194′, to cooperate with a fixed stop 196′, but this second stop is not necessary. It will be evident that with this dual guide block arrangement each vane is adequately supported and is moved at both ends in unison.

The exposed surface of the vanes may be coated with ordinary paint, but if desired one or another of special paints may be used. The paint may be a fluorescent paint which responds to ultraviolet light, the characters then glowing with extra luminosity in daylight, and being given a similar bright glow at night by use of ultraviolet illumination of the board to activate the fluorescent paint. The paint may be one loaded with glass beads to make the same highly reflective, thus adding to the intensity in daylight and in response to automobile headlight illumination. These different paints may be generically referred to as "high intensity paints," which term is here intended to include all such paints which have been improved for high visibility.

As so far described it might be assumed that there is a display board or area at the front having open windows for the segments, as suggested in FIGS. 2, 3 and 4. However, the front may be transparent glass which is darkened or masked everywhere but at the segments, as by the application of black paint to the back of the glass, except at a series of arrays such as that shown in FIG. 1. With prior exhibitor mechanisms a slotted front board or a masked glass is essential in order to conceal a segment which is moved sidewardly from the slot or window.

Such is not the case with the present improved segment because it conceals itself by folding up as previously described. No front board or glass is needed at all, or if a pane of glass is used for protection against weather, the glass may be unmasked or transparent all over its surface. For this reason, the term "segment space" means merely the space occupied by a segment when that segment is displayed. It is convenient to use a term such as "segment space" in order to explain that in FIGS. 9–12 one or another of several segments may occupy the same segment space.

It is believed that the construction and operation of my improved exhibitor or readout, as well as the advantages of the same, will be apparent from the foregoing detailed description. It will also be apparent that while I have shown and described the invention in several preferred forms, changes may be made without departing from the scope of the invention, as sought to be defined in the following claims.

I claim:

1. A segmented exhibitor comprising an extensive character display area having an array of elongated segment spaces and elongated segments for making up characters, each segment being longitudinally divided into two narrow vanes pivoted at their adjoining long edges to fold in face-to-face relation, an actuator operatively connected to the pivoted edges, a stationary guide block fixed behind the segment space and having spaced supports, and means so operatively connecting the vanes at points spaced outward from the inner edges of the vanes to the spaced supports of the block that retraction of the vanes by the actuator into the guide block folds the vanes in face-to-face relation between the spaced supports in order to conceal the faces of the vanes, and advance of the vanes out of the guide block by the actuator opens the vanes in edge-to-edge spread relation in order to expose their faces.

2. A segmented exhibitor comprising an extensive character display area having an array of elongated segment spaces and elongated segments for making up alpha numeric characters, the ends of some segments which meet at angles being appropriately bevelled, each segment being longitudinally divided into two narrow vanes pivoted at their adjoining long edges to fold in face-to-face relation, a stationary guide block fixed behind the segment space and having spaced supports, an actuator behind the guide block and having an actuator rod with its axis perpendicular to the display area, means operatively connecting the actuator rod to the pivoted edges of the vanes, and means so operatively connecting the vanes at points spaced outward from the inner edges of the vanes to the spaced supports of the block that retraction of the vanes by the actuator into the guide block folds the vanes in face-to-face relation between the spaced supports in order to conceal the faces of the vanes, and advance of the vanes out of the guide block by the actuator opens the vanes in edge-to-edge spread relation in order to expose their faces.

3. A segmental exhibitor comprising a character display area having an array of elongated segment spaces and elongated segments for making up characters, each segment being longitudinally divided into two narrow vanes pivoted at their adjoining long edges to fold in face-to-face relation, an actuator having an actuator rod, a fixed guide block having spaced supports behind each segment space, riders carrying the vanes and pivotally connected at their adjacent inner edges to the actuator rod, and means so operatively connecting the outer edges of the riders to the spaced supports of the block that retraction of the rod retracts and folds the vanes and riders in face-to-face relation between said spaced supports in order to conceal the faces of the vanes, and advance of the rod opens the vanes and riders in edge-to-edge spread relation in order to expose their faces.

4. A segmented exhibitor comprising a character display area having an array of elongated segment spaces and elongated segments for making up alpha numeric characters, the ends of some segments which meet at angles being appropriately bevelled, each segment being longitudinally divided into two narrow vanes pivoted at their adjoining long edges to fold in face-to-face relation, a fixed guide block having spaced supports behind each segment space, an actuator behind the guide block with its axis perpendicular to the display area and having an actuator rod, riders carrying the vanes and pivotally connected at their adjacent inner edges to the actuator rod, and means so operatively connecting the outer edges of the riders to the spaced supports of the block that retraction of the rod retracts and folds the vanes and riders in face-to-face relation between said spaced supports in order to conceal the faces of the vanes, and advance of the rod opens the vanes and riders in edge-to-edge spread relation in order to expose their faces.

5. A segmented exhibitor as defined in claim 3 in which the means for operatively connecting the outer edges of the riders to the spaced supports of the block are pivoted links.

6. A segmented exhibitor as defined in claim 3 in which the spaced supports of the block have straight guide tracks and in which the actuator rod carries a crosshead which is guided by said guide tracks, and in which the pivotal connection at the adjacent inner edges of the riders is to the crosshead.

7. A segmented exhibitor as defined in claim 3 in which the spaced supports of the block have straight guide tracks and in which the actuator rod carries a crosshead which is guided by said guide tracks, and in which the pivotal connection at the adjacent inner edges of the riders is to the crosshead, and in which the means operatively connecting the outer edges of the riders to the spaced supports of the block are pivoted links.

8. A segmented exhibitor as defined in claim 3 in which the means operatively connecting the outer edges of the riders to the spaced supports of the block comprise curved guide tracks on the supports and cooperating guide means on the riders receive by and slidable along said guide tracks.

9. A segmented exhibitor as defined in claim 2 in which the actuator is a reversible motor with reduction gearing, and in which the actuator rod is a gear rack moved by a pinion driven by said motor and gearing.

10. A segmented exhibitor as defined in claim 2 in which the segments are long and are carried by two spaced sets of riders cooperating with two spaced guide blocks each with an actuator rod, and in which the actuator is a reversible motor with reduction gearing, and in which the guide rods are gear racks moved by pinions on a common shaft driven by the aforesaid motor and reduction gearing.

11. A segmented exhibitor comprising an extensive character display body having an array of elongated segment spaces and elongated segments for making up characters, each segment being longitudinally divided into two narrow vanes pivoted at their adjoining long edges to fold in face-to-face relation, spreader means tending to open the vanes to spread relation, said segment spaces having the same dimensions as and being occupied by the corresponding segments when the vanes are open, an actuator operatively connected to the pivoted edges, and a stationary guide block fixed behind the segment space and having smooth convexly curved rearwardly convergent guide surfaces on opposite sides of the vanes when the vanes are retracted and folded, the axis of curvature of each curved guide surface extending parallel to the fold line of its respective segment, whereby retraction of the vanes into the guide block by the actuator causes the guide block to fold the vanes to conceal their faces, and advance of the vanes out of the guide block by the actuator causes the spreader means to open the vanes to expose their faces.

12. A segmented exhibitor comprising an extensive character display body having an array of elongated segment spaces and elongated segments for making up alpha numeric charactors, the ends of some segments which meet at angles being appropriately bevelled, each segment being longitudinally divided into two narrow vanes pivoted at their adjoining long edges to fold in face-to-face relation, spreader means tending to open the vanes to spread relaiton, said segment spaces having the same dimensions as and being occupied by the corresponding segments when the vanes are open, an actuator behind the segment and having an actuator rod which is perpendicular to the display area, said actuator rod serving to operatively connect the actuator to the pivoted edges, and a stationary guide block fixed behind the segment space and having smooth convexly curved rearwardly convergent guide surfaces on opposite sides of the vanes when the vanes are retracted and folded, the axis of curvature of each curved guide surface extending parallel to the fold line of its respective segment, whereby retraction of the vanes into the guide block by the actuator causes the guide block to fold the vanes to conceal their faces, and advance of the vanes out of the guide block causes the spreader means to open the vanes to expose their faces, the faces being coated with a high intensity paint, and the backs of the vanes and other parts inside the segment space being a dull black.

13. A segmented exhibitor comprising a character display area having an array of elongated segment spaces and elongated segments for making up characters, each segment being longitudinally divided into two narrow vanes pivoted at their adjoining long edges to fold in face-to-face relation, an actuator having an actuator rod, a fixed guide block behind each segment space, a crosshead secured to the actuator rod and guided in the guide block, riders carrying the vanes and pivoted on the crosshead, a light spring so connected to the riders as to tend to spread the vanes to exposed position, the said guide block having smooth curved rearwardly convergent guide surfaces on which the riders slide, which surfaces guide them into folded position as the rod and crosshead are retracted, whereby retraction of the vanes folds the vanes to conceal their faces, and advance of the vanes opens the vanes to expose their faces.

14. A segmented exhibitor comprising a character display area having an array of elongated segment spaces and elongated segments for making up alpha numeric characters, the ends of some segments which meet at angles being appropriately bevelled, each segment being longitudinally divided into two narrow vanes pivoted at their adjoining long edges to fold in face-to-face relation, an actuator behind the segment and having an actuator rod which is perpendicular to the display area, a fixed guide block behind each segment space, a crosshead secured to the actuator rod and guided in the guide block, riders carrying the vanes and pivoted on the crosshead, a light spring so connected to the riders as to tend to spread the vanes to exposed position, the said guide block having smooth curved rearwardly convergent guide surfaces on which the riders slide, which surfaces guide them into folded position as the rod and cross head are retracted, whereby retraction of the rod and vanes folds the vanes to conceal their faces, and advance of the rod opens the vanes to expose their faces.

15. A segmented exhibitor comprising a character display area having an array of elongated segment spaces and elongated segments for making up alpha numeric characters, each segment being longitudinally divided into two narrow vanes pivoted at their adjoining long edges to fold in face-to-face relation, an actuator behind the segment and having an actuator rod which is perpendicular to the display area, a fixed guide block behind each segment space, a crosshead secured to the actuator rod and guided in the guide block, riders carrying the vanes and pivoted on the crosshead, a light spring so connected to the riders as to tend to spread the vanes to exposed position, the said guide block having smooth curved rearwardly convergent guide surfaces on which the riders slide, which surfaces guide them into folded position as the rod and crosshead are retracted, whereby retraction of the rod and vanes folds the vanes to conceal their faces, and advance of the rod opens the vanes to expose their faces, the faces being coated with a high intensity paint, and the backs of the vanes and other parts inside the segment space being a dull black.

16. A segmented exhibitor comprising a character display area having an array of elongated segment spaces and elongated segments for making up alpha numeric characters, there being a plurality of differently colored segments for each segment space, each segment being longitudinally divided into two narrow vanes pivoted at their adjoining long edges to fold in face-to-face relation, an actuator associated with and located behind each segment and having an actuator rod which is perpendicular to the display area, said actuator rod serving to operatively connect each actuator to the pivoted edges of its associated segment, and means whereby retraction of the rod and vanes folds the vanes to conceal their faces and advance of the rod opens the vanes to expose their faces, the arrangement being such that each segment space may be occupied by any one of a plurality of differently colored segments, the longitudinal dividing line of each segment being so differently located that when all segments of a segment space are retracted and folded they are disposed side-by-side behind the same segment space, and each segment having its own actuator as aforesaid so that any desired character may be displayed in any desired one of the different colors.

17. A segmented exhibitor comprising a character display area having an array of elongated segment spaces and elongated segments for making up alpha numeric characters, the ends of some segments which meet at angles being appropriately bevelled, there being a plurality of differently colored segments for each segment space, each segment being longitudinally divided into two narrow vanes pivoted at their adjoining long edges to fold in face-to-face relation, an actuator associated with and located behind each segment, and having an actuator rod which is perpendicular to the display area, said actuator rod serving to operatively connect each actuator to the pivoted edges of its associated segment, and means whereby retraction of the rod and vanes folds the vanes to conceal their faces, and advance of the rod opens the vanes to expose their faces, the arrangement being such that each segment space may be occupied by any one of a plurality of differently colored segments, the longitudinal dividing line of each segment being so differently located that when all segments of a segment space are retracted and folded they are disposed side-by-side behind the same segment space, and each segment having its own actuator as aforesaid so that any desired character may be displayed in any desired one of the different colors, the faces being coated with a high intensity paint, and the backs of the vanes and other parts inside the segment space being a dull black.

18. A segmented exhibitor comprising a character display area having an array of elongated segment spaces and elongated segments for making up characters, there being two differently colored segments for each segment space, each segment being longitudinally divided into two narrow vanes pivoted at their adjoining long edges to fold in face-to-face relation, two actuators, an actuator being associated with and operatively connected to the pivoted edges of each respective segment, and means whereby retraction of the vanes folds the vanes to conceal their faces, and advance of the vanes opens the vanes to expose their faces, the arrangement being such that each segment space may be occupied by either of the two differently colored segments, the longitudinal dividing line of a first segment being offset from the center in one direction and the longitudinal dividing line of the other segment being offset from the center in the opposite direction, and each segment having its own actuator as aforesaid so that any desired character may be displayed in one color or the other.

19. A segmented exhibitor comprising a character display area having an array of elongated segment spaces and elongated segments for making up alpha numeric characters, there being two differently colored segments for each segment space, each segment being longitudinally divided into two narrow vanes pivoted at their adjoining long edges to fold in face-to-face relation, an actuator associated with and located behind each segment and having an actuator rod which is perpendicular to the display area, said actuator rod serving to operatively connect each actuator to the pivoted edges of its associated segment, and means whereby retraction of the rod and vanes folds the vanes to conceal their faces, and advance of the rod opens the vanes to expose their faces, the arrangement being such that each segment space may be occupied by either of the two differently colored segments, the longitudinal dividing line of a first segment being offset from the center in one direction and the longitudinal dividing line of the other segment being offset from the center in the opposite direction, and each segment having its own actuator as aforesaid so that any desired character may be displayed in one color or the other, the faces being coated with a high intensity paint, and the backs of the vanes and other parts inside the segment space being a dull black.

20. A segmented exhibitor comprising a character display area having an array of elongated segment spaces and elongated segments for making up characters, there being three differently colored segments for each segment space, each segment being longitudinally divided into two narrow vanes pivoted at their adjoining long edges to fold in face-to-face relation, three actuators, an actuator being associated with and operatively connected to the pivoted edges of each respective segment, and means whereby retraction of the vanes folds the vanes to conceal their faces, and advance of the vanes opens the vanes to expose their faces, the arrangement being such that each segment space may be occupied by any one of the three differently colored segments, the longitudinal dividing line of one segment being central, and the dividing line of the other two being offset in opposite directions so that when all three segments are retracted and folded they are disposed side-by-side behind the same segment space, and each segment having its own actuator as aforesaid so that any desired character may be displayed in any desired one of the three different colors.

21. A segmented exhibitor comprising a character display area having an array of elongated segment spaces and elongated segments for making up alpha numeric characters, there being three differently colored segments for each segment space, each segment being longitudinally divided into two narrow vanes pivoted at their adjoining long edges to fold in face-to-face relation, an actuator associated with and located behind each segment and having an actuator rod which is perpendicular to the display area, said actuator rod serving to operatively connect each actuator to the pivoted edges of its associated segment, and means whereby retraction of the rod and vanes folds the vanes to conceal their faces, and advance of the rod opens the vanes to expose their faces, the arrangement being such that each segment space may be occupied by any one of the three differently colored segments, the longitudinal dividing line of one segment being central, and the longitudinal dividing line of the other two being offset in opposite directions so that when all three segments are retracted and folded they are disposed side-by-side behind the same segment space, and each segment having its own actuator as aforesaid so that any desired character may be displayed in any desired one of the three different colors, the faces being coated with a high intensity paint, and the backs of the vanes and other parts inside the segment space being a dull black.

References Cited by the Examiner

UNITED STATES PATENTS

| | | | |
|---|---|---|---|
| 775,272 | 3/1904 | Burnhan | 40—28 |
| 1,079,851 | 11/1913 | Fried | 40—130 |
| 1,191,023 | 7/1916 | Naylor. | |
| 1,357,457 | 11/1920 | Jorgensen | 40—28 |

EUGENE R. CAPOZIO, *Primary Examiner.*

WILLIAM H. GRIEB, *Examiner.*